May 9, 1944. C. E. SCHULING 2,348,655
VEHICLE CHASSIS
Filed Oct. 28, 1943

Inventor
Charles E. Schuling
by Rudolph L. Lowell
att'y

Patented May 9, 1944

2,348,655

UNITED STATES PATENT OFFICE 2,348,655

VEHICLE CHASSIS

Charles E. Schuling, Des Moines, Iowa

Application October 28, 1943, Serial No. 508,017

2 Claims. (Cl. 280—33.44)

This invention relates generally to a chassis for a tractor vehicle and in particular to such a chassis constructed to support a hitch portion at its rear end adapted to be connected with a trailer vehicle.

The use of trailers of either house or general utility type with passenger automobiles is now common practice. In many instances the trailer hitch on the automobile is carried directly on the rear bumper, or is supported on a draw bar connected between the rear bumper and the rear portion of the automobile chassis. As a result the pulling of the trailer and, where a two-wheel trailer is used, a part of the load on the trailer is applied on parts not initially designed or contemplated to be used for such purpose. The pulling of a trailer under these circumstances is, of course, a hazardous operation because of the great possibility of the breakage of these parts and resultant damage to the trailer or to persons and property which might be struck by a run-away trailer.

A further objection to the support of a trailer hitch on an automobile in this manner is found in the fact that the hitch support generally detracts from the appearance of the automobile when it is operated without a trailer.

It is an object of this invention, therefore, to provide a chassis for a tractor vehicle having a trailer hitch support constructed as an integral part thereof.

A further object of this invention is to provide a chassis for a tractor vehicle having a hitch support which provides for a maximum of safety in the pulling of a trailer.

Yet another object of this invention is to provide a chassis for an automobile having a hitch support which is of a rugged construction and which does not detract from the appearance of the automobile when a trailer is disconnected therefrom.

Further objects, features and advantages of this invention will become apparent from the following description when taken in connection with the accompanying drawing in which.

Figure 3:
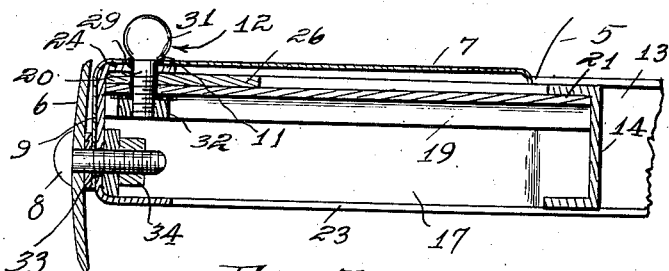
Fig. 3 is an enlarged sectional view taken along the line 3—3 in Fig. 2.
Figure 1:
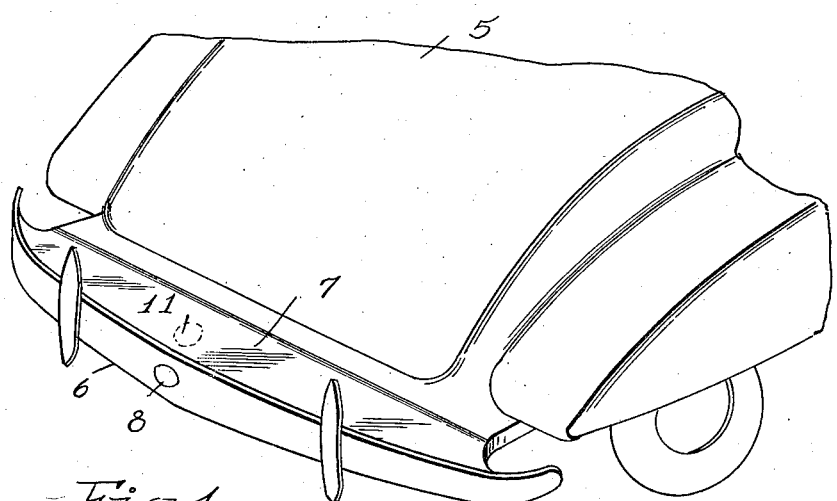
Fig. 1 is a perspective plan view of the rear portion of an automobile showing its neat appearance with the chassis construction of this invention, when a trailer is disconnected from the automobile.

With reference to the drawing there is shown in Figs. 1 and 3 the rear portion of an automobile body 5 of usual type, having a rear bumper 6 spaced rearwardly from the body 5 and a rock shield or fender 7 extended between the body and the bumper in a well known manner. The shield 7 is connected to the bumper by means including a center bumper bolt 8 which is extended through the bumper and a depending ear 9 formed on the shield 7. A knock-out portion 11 is generally provided on the shield 7 adjacent the bolt 8, which on being knocked out permits extension therethrough of a hitch portion 12 for support on a structure located below the rock shield. The structure thus far described is of a generally standard construction and forms no part of the present invention.

Figure 2:
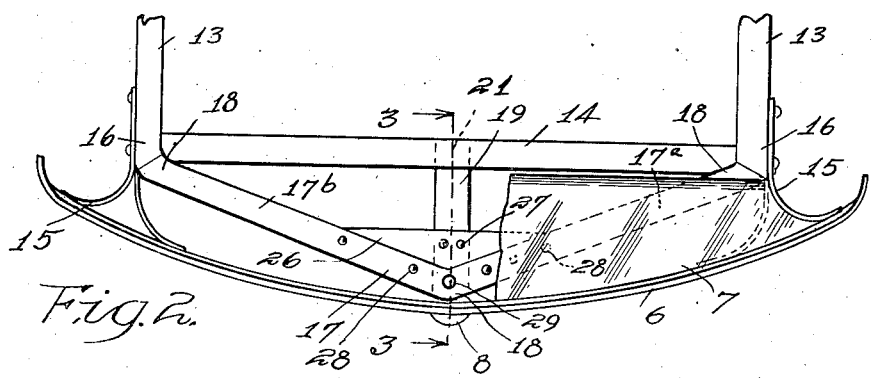
Fig. 2 is a fragmentary plan view of the rear end of an automobile chassis showing the rear bumper and a rock shield and the location of the hitch-supporting structure relative to these parts.

The chassis construction of this invention providing for the rigid support of the trailer hitch portion on a supporting structure located within the confines of the bumper 6 and below the rock shield 7 is best shown in Figs. 2 and 3. Referring to Fig. 2 the chassis is illustrated as including the usual spaced longitudinal side beams 13 which are of a channel construction, and a channel beam 14 extended between the beams 13 and connected with corresponding rear ends 16 of the beams 13. The bumper 6 is supported on the longitudinal members 13 by brackets or braces 15. Formed as a part of the chassis is a rear frame unit, constituting the support for the hitch portion 12, and comprising an angular member 17 of a channel construction having each of its ends 18 connected to a corresponding rear end 16 of a longitudinal beam 13. The member 17 extends rearwardly of the beams 13 substantially in the plane of the beams 13 and the lateral beam 14 with the lateral beam 14 constituting a base for the angular member 17. The angularity of the member 17 and the length of its side portions 17a and 17b are such that the apex 18 thereof is located adjacent the inner side of the bumper 6 substantially centrally of the beams 13 or at the longitudinal central axis of the chassis.

A brace or supporting member 19 of a channel construction is inverted and extended longitudinally of the chassis at its central axis and secured at one end 21 to the transverse beam 14. As shown in Fig. 3 the supporting member 19 is spaced upwardly from the lower side 23 of the angle member 17. At the apex portion 18 and between the upper side 24 of the angle member 17 and the upper side of the supporting member 19, at its end 22, there is interposed a triangular plate member 26 the angularity of which corresponds to the angularity of the member 17. Thus as clearly appears in Fig. 3 the parts of the members 17, supporting member 19 and plate 26 at the apex portion 18 are in a superposed relation. The plate 26 is secured to the supporting member 19 by rivets or the like 27 and to the angular member 17 by rivets or the like 28. In alignment with the knock-out portion 11 in the rock shield 7 is an opening 29 vertically extended through the upper side 24 of the member 17 at its apex portion 18 and through the plate member 26 and supporting member 19.

The hitch portion 12 is of ball type with a shank 20 extended through the aligned openings 11 and 29 with the ball 31 thereof having a diameter greater than the diameter of the opening 29 so as to limit the downward movement of the hitch portion 12 and to provide for the engagement of the ball with the top side 24 of the member 17. The lower portion of the shank 20 is threaded for threadable engagement with a corresponding nut 32 which, on being tightened, engages the supporting member 19 to rigidly hold the hitch portion 12 on the rear frame unit in a manner which is believed to be obvious. It is seen, therefore, that the rear frame unit is of an integral construction with the chassis of the automobile and of a rugged construction to provide for a positive and sturdy support of a trailer (not shown) which is adapted to be connected to the hitch portion 12.

To further supplement the rigidity of the rear frame unit the angle member 17 at the vertical side thereof at the apex portion 18 is formed with an opening 33 which is in alignment with the center bumper bolt 8 and adapted to receive such bolt therethrough. Thus on tightening of the nut 34 for the bolt 8 the rear frame unit is further supported on the bumper 6.

From a consideration of the above description it is seen that the rear frame unit, which constitutes the support for the hitch portion 12 and in turn for the trailer which is to be connected thereto, is located entirely within the confines of the bumper 6 and below the rock shield 7 in a manner to provide for the ball 31 being located above the top level of the shield 7 and the bumper 6. Rigidity of the rear frame unit is accomplished by virtue of its connection with the longitudinal beams 13, the lateral beam 14 and the bumper 6. On disconnection of the trailer from the hitch portion 12, the hitch portion is readily removed, by simply releasing the nut 32, so that there is no evidence on the automobile of its adaptation for connection with a trailer. Although the angular member 17 has been described as being comprised of a single member having its ends connected to the longitudinal beams 13, it is readily apparent that this member may be integrally formed with the longitudinal beams 13, or comprised with its side portions 17a and 17b of two separate pieces, each of which can be connected at one end to a longitudinal beam 13 and with their opposite adjacent ends connected together at the apex portion 18 of the member 17.

Thus, although the invention has been described with respect to a preferred embodiment thereof it is to be understood that it is not to be so limited since changes can be made therein which are within the full intended scope of the invention as defined by the appended claims.

I claim:

1. In a chassis for a tractor vehicle having a pair of spaced longitudinal side frame members, with said vehicle having a rear bumper supported on said frame members and a body terminating inwardly of said rear bumper, means for supporting a hitch portion, adapted to be connected with a trailer vehicle, adjacent to and above the level of said rear bumper comprising an angular member joined at each base end thereof with a longitudinal member and extended rearwardly from said longitudinal members within the confines of said rear bumper, with the apex portion of said angular member being at the longitudinal central axis of said chassis and adjacent the inner side of said rear bumper, a lateral member connected between the base ends of said angular member and constituting a base therefor, and a longitudinally extending supporting member secured to said lateral member and to said angular member at the apex portion thereof, with a vertically extended opening being formed through said supporting member and said apex portion adapted to receive said hitch portion therethrough.

2. A chassis for a tractor vehicle, said chassis comprising a pair of spaced longitudinal beams and a transverse beam connected between the corresponding rear ends of said longitudinal beams, a channel-shaped angular frame member having the base ends thereof spaced a distance apart to provide for each of said ends being secured to a corresponding rear end of a longitudinal beam, with said angular member being in the plane of said longitudinal beams and extended rearwardly therefrom with its apex portion substantially at the longitudinal central axis of said chassis, a supporting member rigidly connected to said transverse beam and to said apex portion in a parallel relation with said longitudinal beams, a plate member of a triangular shape corresponding to the angle of said angular member and secured to said supporting member and angular member at said apex portion, with said plate member, angular member and supporting member having a vertical opening therethrough at said apex portion for receiving a hitch portion adapted to be connected with a trailer vehicle.

CHARLES E. SCHULING.